United States Patent
Lin et al.

(10) Patent No.: US 7,387,667 B1
(45) Date of Patent: Jun. 17, 2008

(54) BLACK DYE COMPOSITION AND BLACK INK COMPOSITION

(75) Inventors: Wen-Chin Lin, Taoyuan Hsien (TW); Tzu-Kwei Sun, Taoyuan Hsien (TW); Reng-Fang Lin, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 11/898,530

(22) Filed: Sep. 13, 2007

(30) Foreign Application Priority Data

Apr. 16, 2007 (CN) .................... 2007 1 0090192

(51) Int. Cl.
*C09D 11/00* (2006.01)
*C09B 62/453* (2006.01)

(52) U.S. Cl. .............. 106/31.48; 106/31.52; 106/31.51; 106/31.49; 106/31.58; 106/31.59; 8/549; 8/641

(58) Field of Classification Search ......... 106/31.48, 106/31.52, 31.51, 31.49, 31.58, 31.59; 8/543, 8/549, 641
See application file for complete search history.

(56) References Cited

U.S. PATENT DOCUMENTS

| | | | |
|---|---|---|---|
| 4,694,302 A | 9/1987 | Hackleman et al. | 106/31.58 |
| 5,062,892 A | 11/1991 | Halko | 106/31.58 |
| 5,445,654 A * | 8/1995 | Hussong et al. | 8/549 |
| 5,611,821 A | 3/1997 | Huang et al. | 8/549 |
| 5,690,698 A * | 11/1997 | Von Der Eltz et al. | 8/549 |
| 5,725,641 A | 3/1998 | MacLeod | 106/31.5 |
| 5,779,739 A * | 7/1998 | Von Der Eltz et al. | 8/549 |
| 6,126,700 A | 10/2000 | Bao-Kun et al. | 8/549 |
| 7,288,142 B2 * | 10/2007 | Lin et al. | 106/31.52 |
| 2003/0177945 A1 * | 9/2003 | Li et al. | 106/31.58 |
| 2006/0260507 A1 * | 11/2006 | Lacroix | 106/31.48 |
| 2007/0050926 A1 * | 3/2007 | Lin et al. | 8/568 |

* cited by examiner

*Primary Examiner*—Helene Klemanski
(74) *Attorney, Agent, or Firm*—Bacon & Thomas, PLLC.

(57) ABSTRACT

The present invention relates to a black dye composition, comprising:
(a) a compound of the following formula (I),

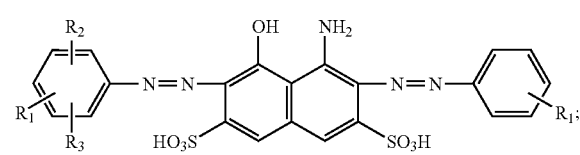

(b) a compound of the following formula (II),

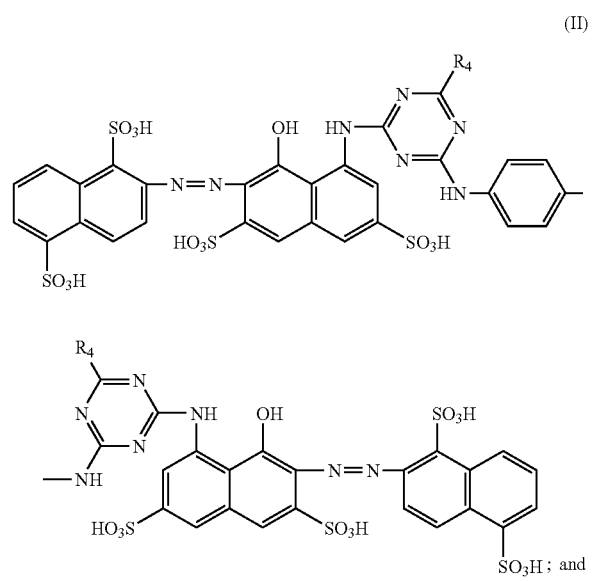

(c) a compound of the following formula (III),

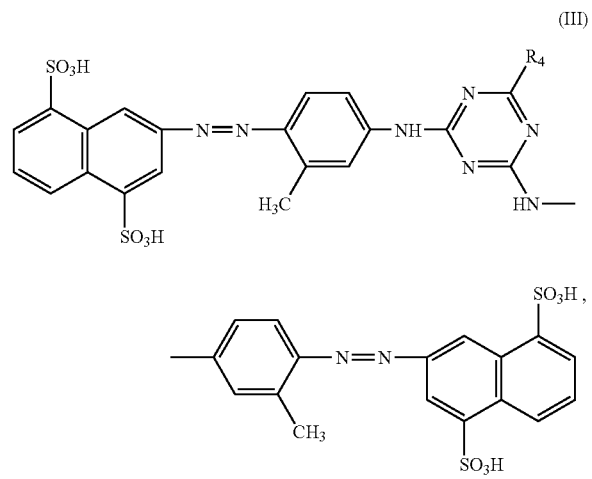

wherein $R_1$, $R_2$, $R_3$, and $R_4$ are defined the same as the specification. The present invention also relates to a black ink composition afforded from the aforementioned black dye composition. The black ink composition of the present invention is suitable for paper ink-jet printing, and exhibits the properties of good light-fastness, high color strength, solubility, and fine fluency of ink.

17 Claims, No Drawings

BLACK DYE COMPOSITION AND BLACK INK COMPOSITION

BACKGROUND OF THE INVENTION

1. Field of the Invention

The present invention relates to a black dye composition and a black ink composition suitable for paper ink-jet printing.

2. Description of the Related Prior Art

Ink-jet printing is a non-impact printing method, and the involved features thereof include sharp, non-feathering patterns, good water-fastness, light-fastness, and optical density. Properties such as fast drying and fine storage stability, fine fluency of ink, and non-clogging are also included.

As reactive dyes (such as C.I. Reactive Black 31) are used as the components of ink-jet printing ink, with time the reactive groups undergo hydrolysis, which then results in instability of pH value and an increasing amount of salts in the ink, and the issues of clogging at the nozzles or variability of the hue of the ink and others occur.

U.S. Pat. No. 4,694,302 and U.S. Pat. No. 5,062,892 disclose that the dyes (such as C.I. Food Black 2) commonly used as the components of black ink in the past exhibit poor light-fastness and other properties.

U.S. Publication No. 2007/0050926 and U.S. Publication No. 2006/0174800 disclose that a dye mixture used for preparing a black ink composition can improve the light-fastness, but the light-fastness and the color strength still cannot satisfy the above requirements for printing.

As a result, the effort for a dye composition for the ink-jet printing ink with good light-fastness, high color strength, good solubility and fine fluency of ink is a direction to keep working.

SUMMARY OF THE INVENTION

The present invention provides a black dye composition used for preparing a black ink composition. The present invention further provides a black ink composition and, more particularly, to a black ink composition suitable for paper ink-jet printing, and having the properties of good light-fastness, high color strength, good solubility, and fine fluency of ink.

The dye composition of the present invention comprises:
(a) a compound of the following formula (I),

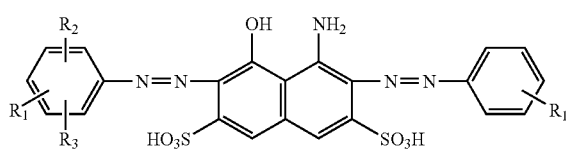

wherein $R_1$ is $-SO_2CH_2CH_2OSO_3H$, $-SO_2CH_2CH_2OH$, $-SO_2CH=CH_2$, or $-SO_3H$; $R_2$ and $R_3$ each independently is $-SO_3H$, $-CH_3$, $-OCH_3$, or H;

(b) a compound of the following formula (II),

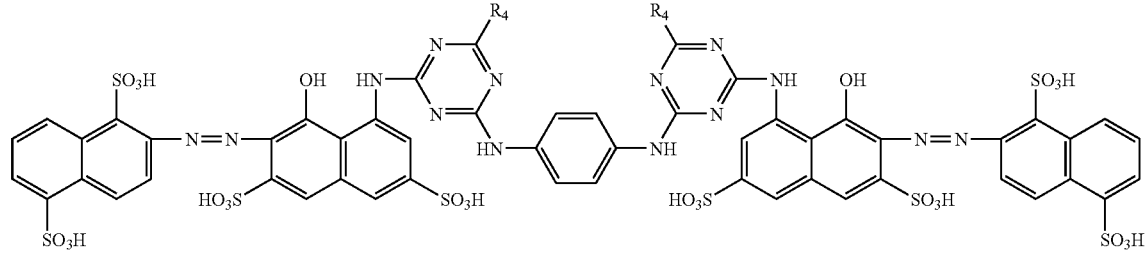

wherein $R_4$ is $-Cl$, $-OH$, $-NH_2$, $-NHCH_2CH_2OH$, or $-N(CH_2CH_2OH)_2$; and (c) a compound of the following formula (III),

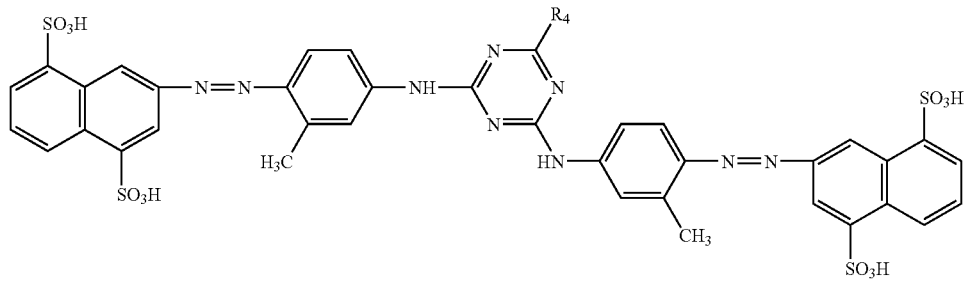

wherein, $R_4$ is defined as above;

wherein the compound (I) of the component (a) is 25%~98% by weight; the compound (II) of the component (b) is 1%~35% by weight; and the compound (III) of the component (c) is 1%~40% by weight. Hereafter, the black dye composition comprising the above component (a), component (b), and component (c) in the aforementioned component ratio is represented by "the first black dye composition of the present invention".

In addition to the aforementioned component (a), component (b), and component (c), the black dye composition of the present invention further comprises the following components:

(d) at least one compound of the following formula (IV), (V), or (VI),

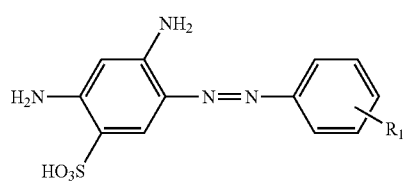
(IV)

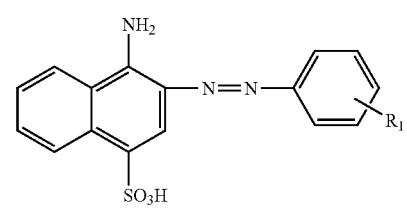
(V)

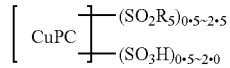
(VI)

wherein $R_1$ is defined as above, $R_5$ is —OH, —NH$_2$, —NHCH$_2$CH$_2$OH, or —N(CH$_2$CH$_2$OH)$_2$;

wherein the compound of the component (a) is 25%~93% by weight; the compound of the component (b) is 1%~25% by weight; the compound of the component (c) is 1%15% by weight; and the compound of the component (d) is 5%~35% by weight. Hereafter, the black dye composition comprising the above component (a), component (b), component (c), and component (d) in the aforementioned component ratio is represented by "the second black dye composition of the present invention".

In addition to the aforementioned component (a), component (b), component (c), and the component (d), the black dye composition of the present invention further comprises the following components:

(e) at least one compound of the following formula (VII) or (VIII),

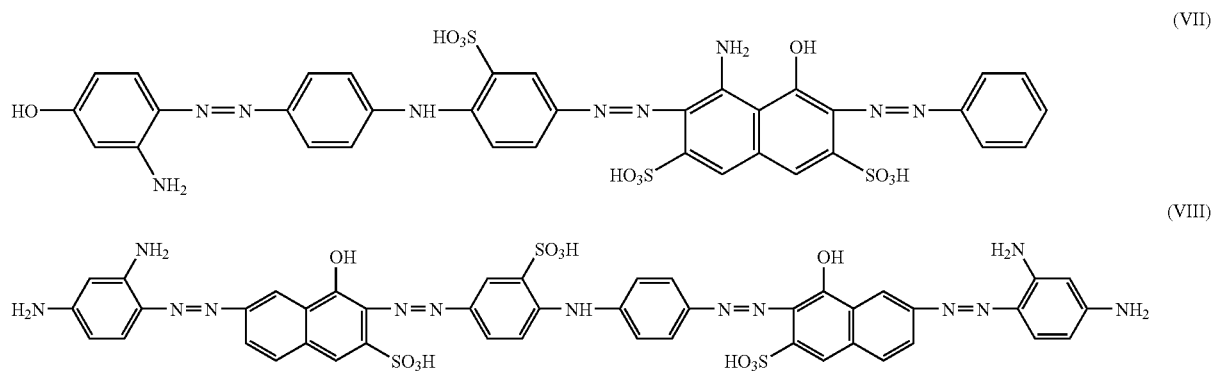
(VII)

(VIII)

wherein the compound of the component (a) is 25%~83% by weight; the compound of the component (b) is 1%~25% by weight; the compound of the component (c) is 1% 15% by weight; the compound of the component (d) is 5%~35% by weight; and the compound of the component (e) is 10%~30% by weight. Hereafter, the black dye composition comprising the above component (a), component (b), component (c), component (d), and component (e) in the aforementioned component ratio is represented by "the third black dye composition of the present invention".

Preferably, the compound of the formula (I) is

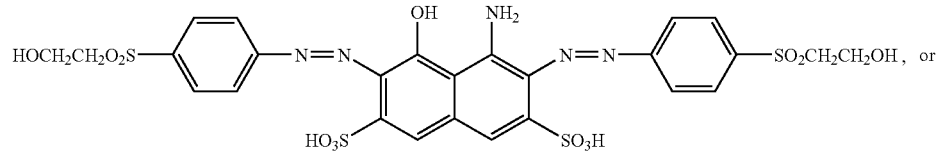
(I-1)

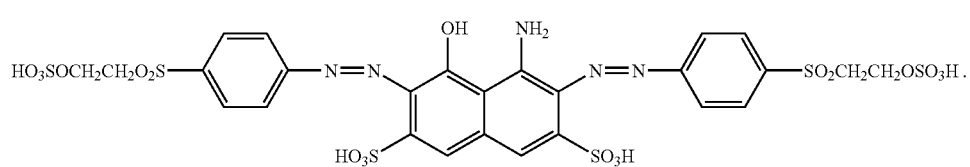
(I-2)
Preferably, the compound of the formula (II) is
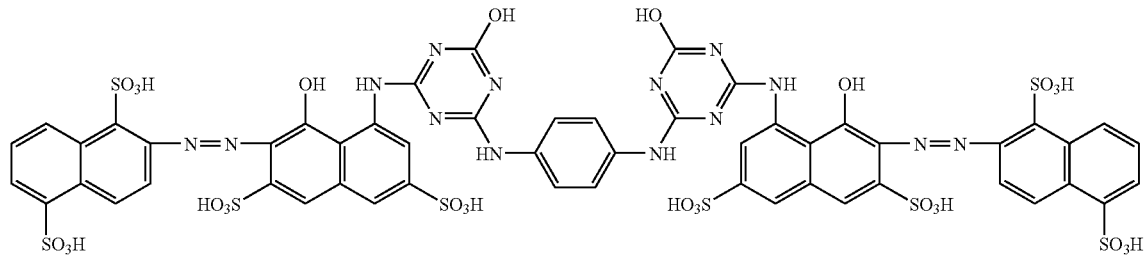
(II-1)
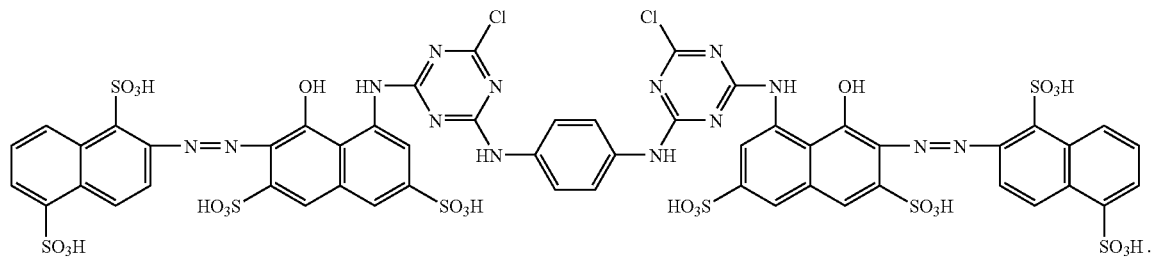
(II-2)
Preferably, the compound of the formula (III) is
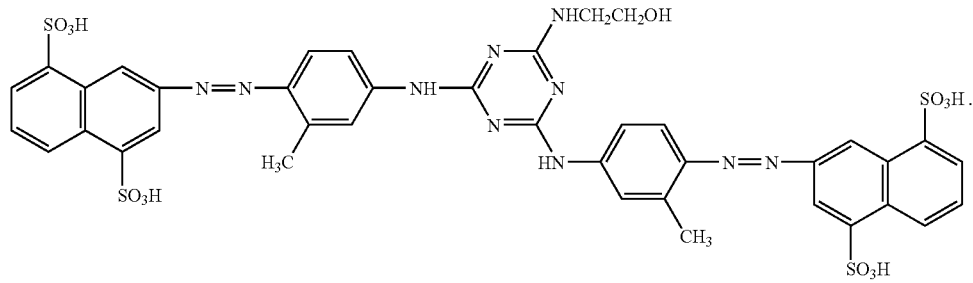
(III-1)
Preferably, the compound of the formula (IV) is
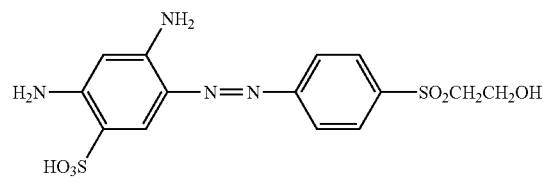
(IV-1)
Preferably, the compound of the formula (V) is
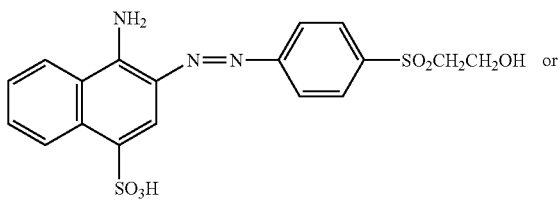
(V-1)

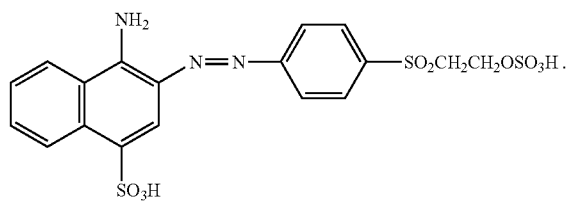

(V-2)

Preferably, the compound of the formula (VI) is

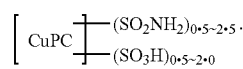

(VI-1)

In the present invention, the compounds are represented in the form of free acid. However, in practice, they often exist as metallic salts or ammonium salts, and most likely alkaline metallic salts or ammonium salts.

In the present invention, the component ratio of the black dye composition can be varied without limitation. In general, the minimum of the relative weight percentage of each component ratio is 1%, and the maximum of the relative weight percentage of each component ratio is 99%.

The black dye composition of the present invention can be further used for the manufacture of a black liquid dye composition. The black liquid dye composition of the present invention comprises: 4%~50% by weight of a black dye composition selected from the group consisting of the first, the second, and the third black dye composition of the present invention; 1%~40% by weight of urea; and 10%~95% by weight of water. Preferably, the black dye composition is 18%~40% by weight; the urea is 1% 18% by weight; and the water is 42%~81% by weight.

The black dye composition of the present invention can be further used for the manufacture of a black ink composition.

The black ink composition of the present invention comprises:

(A) 0.1%~35% by weight of a black dye composition selected from the group consisting of the first, the second, and the third black dye composition of the present invention;

(B) 5%~35% by weight of an organic solvent selected from the group consisting of ethylene glycol, diethylene glycol, triethylene glycol, propylene glycol, butylene glycol, ethylene glycol monoethyl ether, ethylene glycol monobutyl ether, diethylene glycol monobutyl ether, diethylene glycol monomethyl ether, glycerin, 2-pyrrolidone, N-methyl-2-pyrrolidone, 1,3-dimethyl-2-imidazolidinone, and triethanolamine; and (C) 25%~94.9% by weight of water.

The black ink composition of the present invention can further comprise:

(D) 0.1%~5% by weight of a surfactant of the following formula (IX), such as Surfynol 465, Surfynol 485, Surfynol 420, and Surfynol 104 (commercially available in Air Products & Chemicals, Inc.),

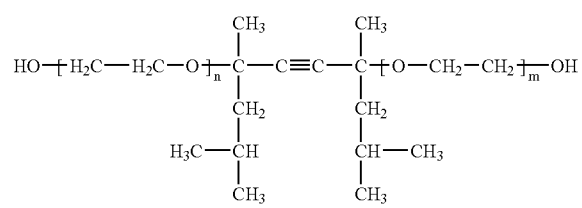

(IX)

wherein the sum of n and m is integer between 0 and 50.

In the component (A) of the black ink composition according to the present invention, preferably, the compound of the formula (I) is that of the following formula (I-1),

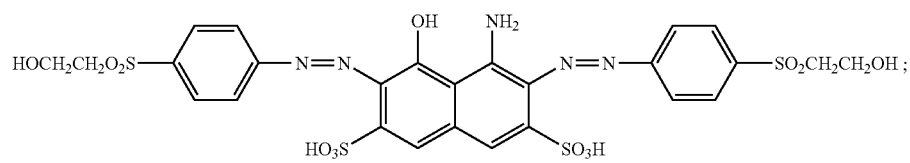

(I-1)

the compound of the formula (II) is that of the following formula (II-1),

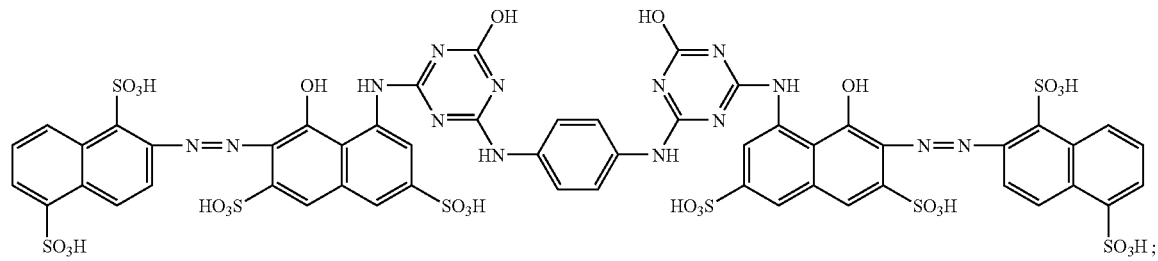

(II-1)

the compound of the formula (III) is that of the following formula (III-1),

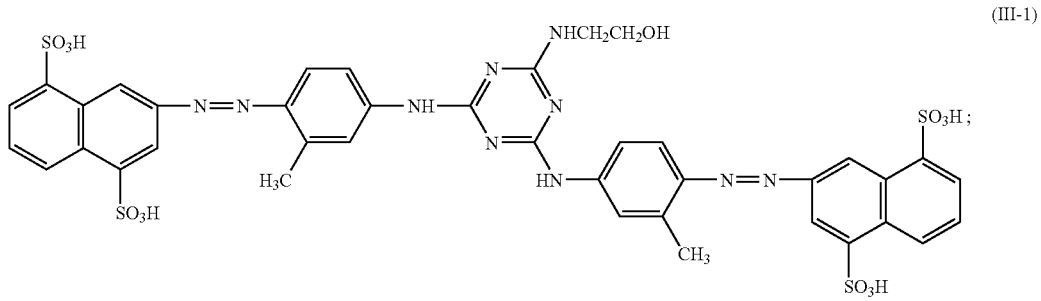

the compound of the formula (IV) is that of the following formula (IV-1),

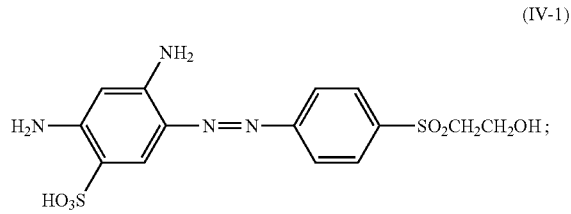

the compound of the formula (V) is that of the following formula (V-1),

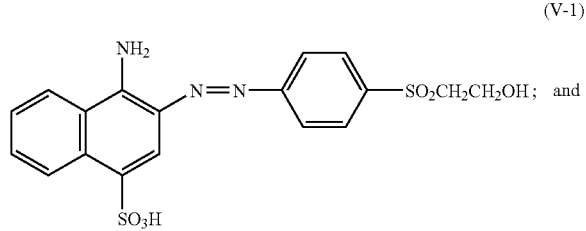

the compound of the formula (VI) is that of the following formula (VI-1),

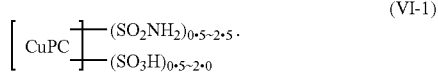

If necessary, (E) buffer and/or microbicide can be added to the black ink composition of the present invention. The buffer is, for example, acetic acid, acetate, phosphoric acid, phosphate, borax, borate, or citrate. The microbicide is, for example, NUOSEPT (commercially available in Nudex Inc., a division of Huls Americal), UCARCIDE (commercially available in Union Carbide), VANCIDE (commercially available in RT Vanderbikt Co.), or PROXEL XL2 (commercially available in ICI Americas). The aforementioned additives can refer to those disclosed in U.S. Publication No. 2003/0177945 and U.S. Pat. No. 5,725,641. Based on the total weight of the black ink composition, the content of the additives is commonly 0.01~1% by weight.

DETAILED DESCRIPTION OF THE PREFERRED EMBODIMENT

The specific structures and preparations of the compounds according to the present invention are exemplified as below, and not limited to the following descriptive examples.

The compounds of the formula (I-2), (II-2), (III-1), (IV-2), (V-2), (VI-1), (VII), and (VIII) can be synthesized by a conventional method for preparing dyes. Alternatively, the aforementioned compounds can be commercially obtained from Everlight Chemical Industrial Corporation.

The pH value of the compound (I-2) aqueous solution is adjusted to 9~10 by 45% NaOH aqueous solution, and the temperature is controlled in the range of 25~30° C. to perform hydrolysis for 60 minutes. Subsequently, the pH value is adjusted to 5~9 by 32% HCl aqueous solution to perform desalination by reverse osmosis, and then the compound (I-3) of the present invention is afforded by spray drying.

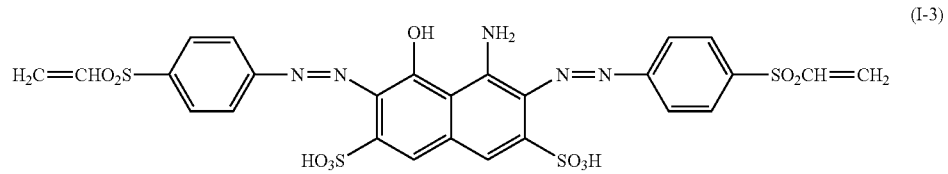

The pH value of the compound (I-3) aqueous solution is adjusted to 10~12 by 45% NaOH aqueous solution, and then the temperature is raised to the range of 80~90° C. to perform reaction for 90 minutes. Subsequently, the pH value is adjusted to 5~9 by 32% HCl aqueous solution to perform desalination by reverse osmosis, and then the compound (I-1) of the present invention is afforded by spray drying.

The pH value of the compound (II-2) aqueous solution is adjusted to 10~12 by 45% NaOH aqueous solution, and then the temperature is raised to the range of 80~90° C. to perform reaction for 90 minutes. Subsequently, the pH value is adjusted to 5~9 by 32% HCl aqueous solution to perform desalination by reverse osmosis, and then the compound (II-1) of the present invention is afforded by spray drying.

The water-soluble reactive dyes in the black ink composition of the present invention can be the aforementioned dyes or the alkali metal salts thereof used alone or in a mixture. Preferably, the salt amount existing in the reactive dyes should be low. It means that with respect to the total weight of the reactive dyes of the present invention, the total salt amount existing in the reactive dyes is less than 0.5% by weight. The reactive dyes with the high amount of salts afforded from the preparation and/or the following addition of diluents can be treated with the procedure of desalination, such as thin-film process (e.g. super filtration, nanofiltration, reverse osmosis, or osmosis).

The black ink composition of the present invention can be prepared by a conventional method, mixing all components in water of required amount.

The examples sited below should not be taken as a limit to the scope of the invention. Wherein the compounds are represented in the form of free acid. However, in practice, they often exist as metallic salts or ammonium salts, and most likely alkaline metallic salts or ammonium salts. Unless otherwise stated, the parts and percent used in the following examples are based on weight, and the temperature is in degree Celsius (° C.).

Preparative Example 1

300 parts of compound (I-2) is dissolved in 2700 parts of water, and then the pH value of the solution is adjusted to 10~11 by 45% NaOH aqueous solution. Subsequently, the temperature is controlled in the range of 80~85° C. to perform hydrolysis for 90 minutes. Then, the pH value is adjusted to 5~9 by 32% HCl aqueous solution to perform desalination by reverse osmosis, and finally the compound (I-1) of the present invention is afforded by spray drying.

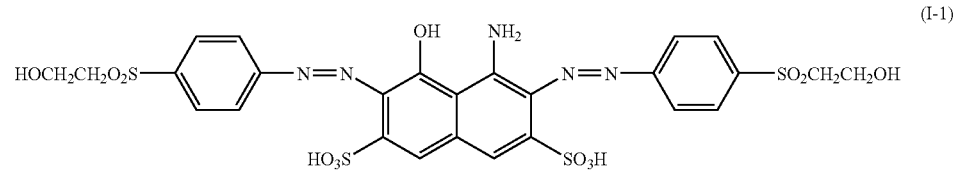

Preparative Example 2

The same procedure is carried out as in Preparative Example 1 except that compound (II-2) is used instead of compound (I-2) to afford the compound (II-1) of the present invention.

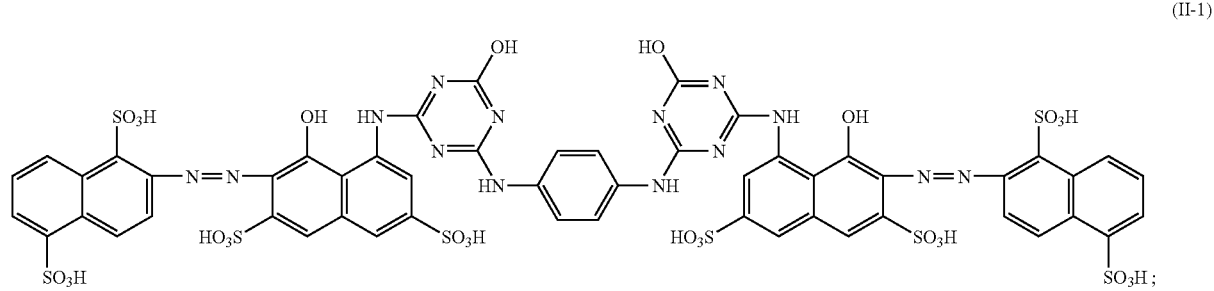

Preparative Example 3

The same procedure is carried out as in Preparative Example 1 except that compound (IV-2) is used instead of compound (I-2) to afford the compound (IV-1) of the present invention.

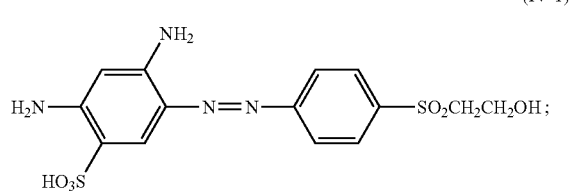

(IV-1)

Preparative Example 4

The same procedure is carried out as in Preparative Example 1 except that compound (V-2) is used instead of compound (I-2) to afford the compound (V-1) of the present invention.

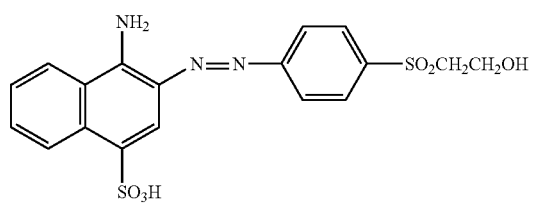

(V-1)

Example 1

Preparation of Black-Dye Composition 21.7 parts of compound (I-1), 2.55 parts of compound (II-1), 1.2 parts of compound (III-1), 1.8 parts of compound (IV-1), and 2.3 parts of compound (V-1) are mixed, water is added to form 100 parts of solution, and the pH value of the solution is adjusted to 5~9 by 32% HCl aqueous solution or 45% NaOH aqueous solution. Finally, the black dye composition of the present invention is afforded by desalination with reverse osmosis.

Example 2

Preparation of Black Dye Composition 18 parts of compound (I-1), 4.3 parts of compound (II-1), and 6 parts of compound (III-1), water is added to form 100 parts of solution, and the pH value of the solution is adjusted to 5~9 by 32% HCl aqueous solution or 45% NaOH aqueous solution. Finally, the black dye composition of the present invention is afforded by desalination with reverse osmosis.

Example 3

Preparation of Black Dye Composition 23.4 parts of compound (I-1), 0.9 part of compound (II-1), 0.6 part of compound (III-1), 1.8 parts of compound (IV-1), and 3.8 parts of compound (V-1) are mixed, water is added to form 100 parts of solution, and the pH value of the solution is adjusted to 5~9 by 32% HCl aqueous solution or 45% NaOH aqueous solution. Finally, the black dye composition of the present invention is afforded by desalination with reverse osmosis.

Example 4

Preparation of Black Dye Composition 17 parts of compound (I-1), 1.7 parts of compound (II-1), 1.56 parts of compound (III-1), 1.5 parts of compound (IV-1), 2.3 parts of compound (V-1), 0.05 part of compound (VI-1), and 3.76 parts of compound (VII) are mixed, water is added to form 100 parts of solution, and the pH value of the solution is adjusted to 5~9 by 32% HCl aqueous solution or 45% NaOH aqueous solution. Finally, the black dye composition of the present invention is afforded by desalination with reverse osmosis.

Example 5

Preparation of Black Dye Composition 17 parts of compound (I-1), 1.7 parts of compound (II-1), 1.08 parts of compound (III-1), 1.08 parts of compound (IV-1), 1.5 parts of compound (V-1), 0.25 part of compound (VI-1), and 4 parts of compound (VII) are mixed, water is added to form 100 parts of solution, and the pH value of the solution is adjusted to 5~9 by 32% HCl aqueous solution or 45% NaOH aqueous solution. Finally, the black dye composition of the present invention is afforded by desalination with reverse osmosis.

Example 6

Preparation of Black Ink Composition (A) 22.2 parts of the black dye composition of Example 1; and (B) 10 parts of ethylene glycol, 10 parts of diethylene glycol monobutyl ether, and 7 parts of glycerin are mixed, and (C) water is added to form 100 parts of solution. The solution is stirred for 0.5 hour by a mechanical stirring motor and then performs absolutely-filtration by 0.45 μm filter paper to afford the black ink composition of the present invention.

Example 7

Preparation of Black Ink Composition (A) 28.8 parts of the black dye composition of Example 2; (B) 10 parts of ethylene glycol, 10 parts of diethylene glycol monobutyl ether, and 7 parts of glycerin; and (D) 1 part of Surfynol 465 (surfactant) are mixed, and (C) water is added to form 100 parts of solution. The solution is stirred for 0.5 hour by a mechanical stirring motor and then performs absolutely-filtration by 0.45 μm filter paper to afford the black ink composition of the present invention.

Example 8

Preparation of Black Ink Composition (A) 24.3 parts of the black dye composition of Example 3; (B) 10 parts of ethylene glycol, 10 parts of diethylene glycol monobutyl ether, and 7 parts of glycerin; (D) 1 part of Surfynol 465 (surfactant); and (E) 0.3 part of Proxel XL2 (microbicide) are mixed, and (C) water is added to form 100 parts of solution. The solution is stirred for 0.5 hour by a mechanical stirring motor and then performs absolutely-filtration by 0.45 μm filter paper to afford the black ink composition of the present invention.

Example 9

Preparation of Black Ink Composition (A) 24.3 parts of the black dye composition of Example 4; (B) 10 parts of ethylene glycol, 10 parts of diethylene glycol monobutyl ether, and 7 parts of glycerin; (D) 1 part of Surfynol 465 (surfactant); and (E) 0.3 part of Proxel XL2 (microbicide) are mixed, and (C) water is added to form 100 parts of solution. The solution is stirred for 0.5 hour by a mechanical stirring motor and then performs absolutely-filtration by 0.45 μm filter paper to afford the black ink composition of the present invention.

Example 10

Preparation of Black Ink Composition (A) 24.3 parts of the black dye composition of Example 5; (B) 10 parts of ethylene glycol, 10 parts of diethylene glycol monobutyl ether, and 7 parts of glycerin; (D) 1 part of Surfynol 465 (surfactant); and (E) 0.3 part of Proxel XL2 (microbicide) are mixed, and (C) water is added to form 100 parts of solution. The solution is stirred for 0.5 hour by a mechanical stirring motor and then performs absolutely-filtration by 0.45 μm filter paper to afford the black ink composition of the present invention.

Comparative Example 1

Preparation of Black Ink Composition 20 parts of Bayscrip Black SP (commercially available in Bayer); 10 parts of ethylene glycol; 10 parts of diethylene glycol monobutyl ether; 7 parts of glycerin; 1 part of Surfynol 465 (surfactant); and 0.3 part of Proxel XL2 (microbicide) are mixed, and water is added to form 100 parts of solution. The solution is stirred for 0.5 hour by a mechanical stirring motor and then performs absolutely-filtration by 0.45 μm filter paper to afford the black ink composition.

Comparative Example 2

Preparation of Black Ink Composition 43.9 parts of Duasyn Black GHEF-SF LIQ. (commercially available in Clariant); 10 parts of ethylene glycol; 10 parts of diethylene glycol monobutyl ether; 7 parts of glycerin; 1 part of Surfynol 465 (surfactant); and 0.3 part of Proxel XL2 (microbicide) are mixed, and water is added to form 100 parts of solution. The solution is stirred for 0.5 hour by a mechanical stirring motor and then performs absolutely-filtration by 0.45 μm filter paper to afford the black ink composition.

Methods and Results of Color strength and Light-Fastness Tests

Condition:

Ink: the black ink compositions of Examples 6 to 10 and Comparative Examples 1 to 2.

Paper: Plain Paper.

Printer: EPSONSTYLUS C45 PRINTER.

Color strength: FORMULA: CIE L*a*b*.

Light-Fastness Test:

The printed-paper is exposed under xenon arc lamp, and the condition is set so that a total energy of 85KJ is applied. The color difference of before and after xenon arc lamp exposure is examined with the use of ICS color spectrometer, where larger the magnitude of DE larger the color difference is between before and after exposure, which means poorer light-fastness.

Formula (Light-Fastness Level): ISO A05.

The results are presented in the following Table 1.

TABLE 1

| Black Ink Composition | Color Strength | ISO A05 (Light-Fastness Level) |
|---|---|---|
| Example 6 | 100% | 3 |
| Example 7 | 99% | 3 |
| Example 8 | 97% | 2-3 |
| Example 9 | 99% | 3 |
| Example 10 | 98% | 3 |
| Comparative Example 1 | 94% | 1-2 |
| Comparative Example 2 | 81% | 3 |

According to the above Table 1, it is known that the black ink compositions of the present invention exhibit good light-fastness and high color strength.

From the foregoing description, regardless of the objects, the techniques, the effects or the skill aspects and developments, the present invention is distinctive with respect to known skills. Although the present invention has been explained in relation to its preferred embodiment, it is to be understood that many other possible modifications are variations can be made without departing from the scope of the invention as hereinafter claimed.

What is claimed is:

1. A black dye composition, comprising:
(a) a compound of the following formula (I),

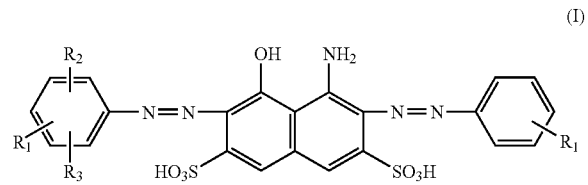

wherein $R_1$ is —$SO_2CH_2CH_2OSO_3H$—$SO_2CH_2CH_2OH$, —$SO_2CH$=$CH_2$, or —$SO_3H$; $R_2$ and $R_3$ each independently is —$SO_3H$, —$CH_3$, —$OCH_3$, or H;
(b) a compound of the following formula (II),

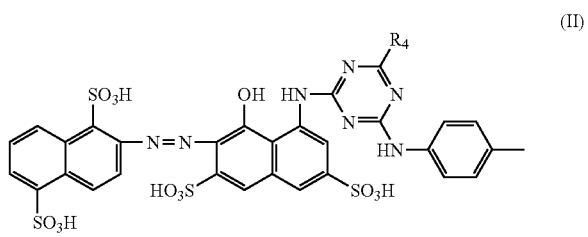

-continued

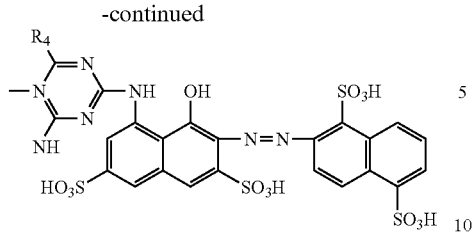

wherein $R_4$ is —Cl, —OH, —NH$_2$, —NHCH$_2$CH$_2$OH, or —N(CH$_2$CH$_2$OH)$_2$; and (c) a compound of the following formula (III), (III)

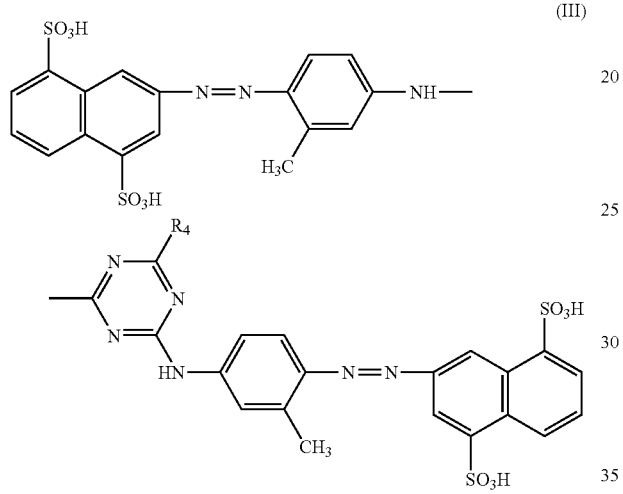

wherein, $R_4$ is defined as above;

wherein the compound (I) of the component (a) is 25%~98% by weight; the compound (II) of the component (b) is 1%~35% by weight; and the compound (III) of the component (c) is 1%~40% by weight.

2. The black dye composition as claimed in claim 1, further comprising:

(d) at least one compound of the following formula (IV), (V), or (VI), (IV)

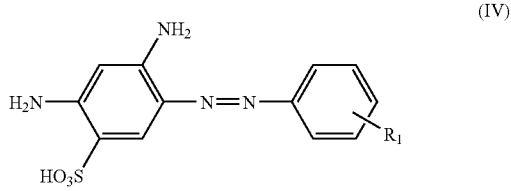

(V)

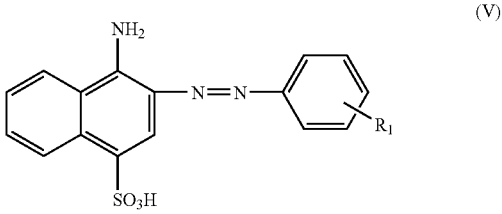

(VI)

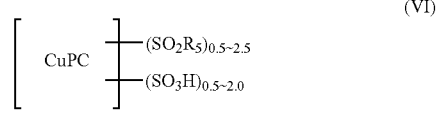

wherein $R_1$ is defined as claim 1, $R_5$ is —OH, —NH$_2$, —NHCH$_2$CH$_2$OH, or —N(CH$_2$CH$_2$OH)$_2$;

wherein the compound of the component (a) is 25%~93% by weight; the compound of the component (b) is 1%~25% by weight; the compound of the component (c) is 1%~115% by weight; and the compound of the component (d) is 5%~35% by weight.

3. The black dye composition as claimed in claim 2, further comprising:

(e) at least one compound of the following formula (VII) or (VIII), (VII)

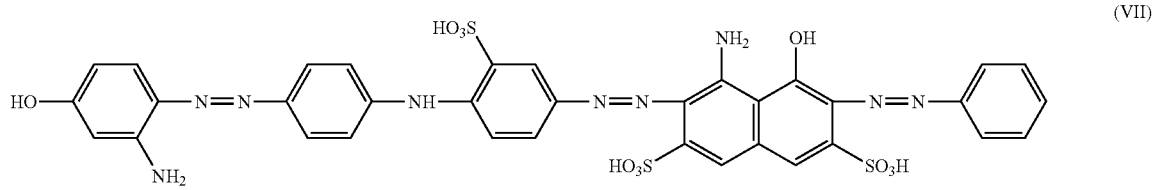

(VIII)

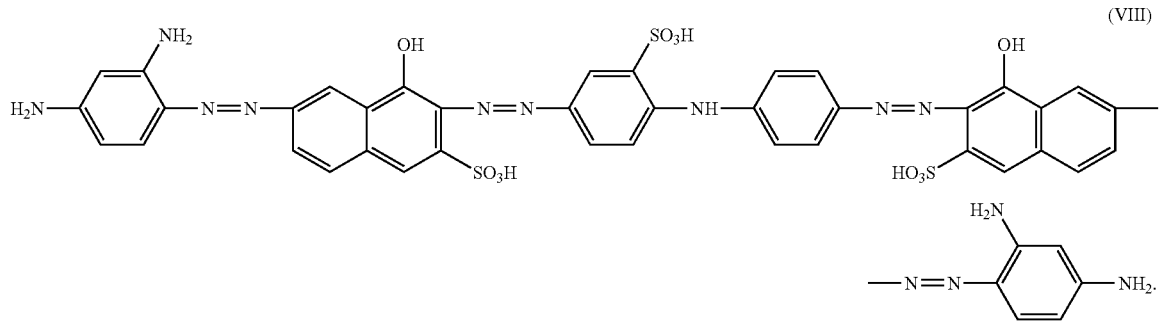

wherein the compound of the component (a) is 25%~83% by weight; the compound of the component (b) is 1%~25% by weight; the compound of the component (c) is 1% 15% by weight; the compound of the component (d) is 5%~35% by weight; and the compound of the component (e) is 10%~30% by weight.

4. The black dye composition as claimed in claim 1, wherein the compound of the formula (I) is that of the following formula (I-1),

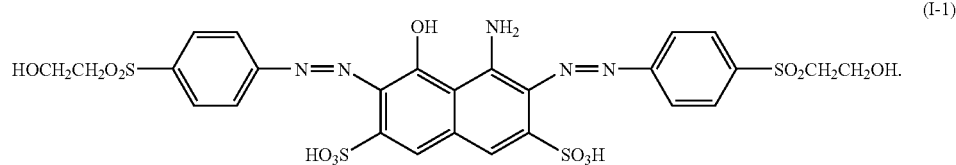

(I-1)

5. The black dye composition as claimed in claim 1, wherein the compound of the formula (II) is that of the following formula (II-1),

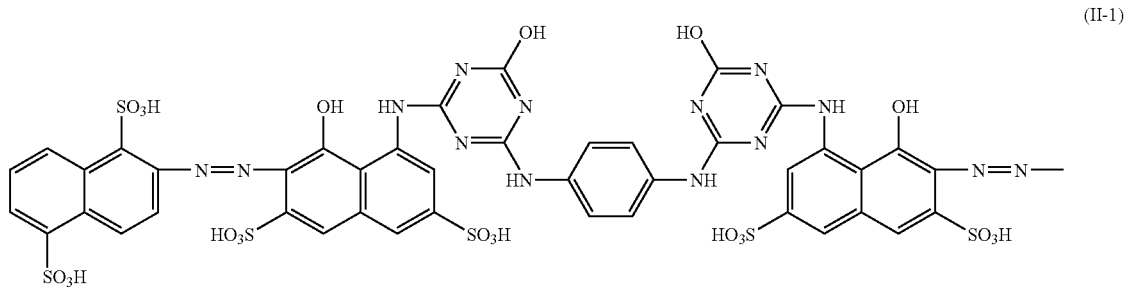

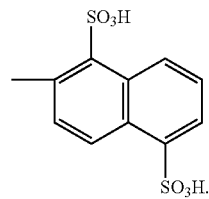

(II-1)

6. The black dye composition as claimed in claim 1, wherein the compound of the formula (III) is that of the following formula (III-1),

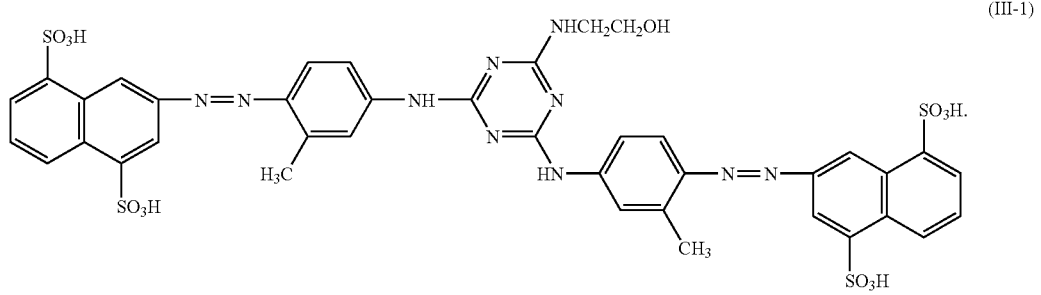

(III-1)

7. The black dye composition as claimed in claim 2, wherein the compound of the formula (IV) is that of the following formula (IV-1),

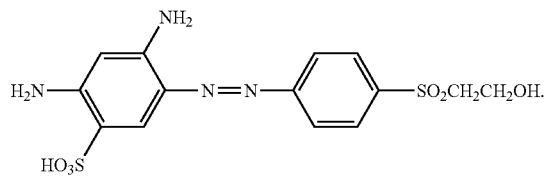
(IV-1)

8. The black dye composition as claimed in claim 2, wherein the compound of the formula (V) is that of the following formula (V-1),

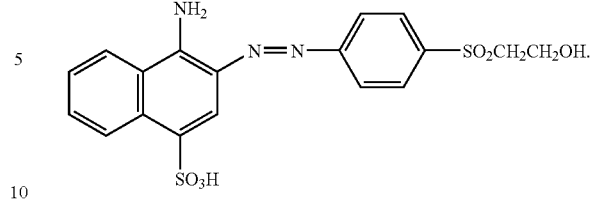
(V-1)

9. The black dye composition as claimed in claim 2, wherein the compound of the formula (VI) is that of the following formula (VI-1),

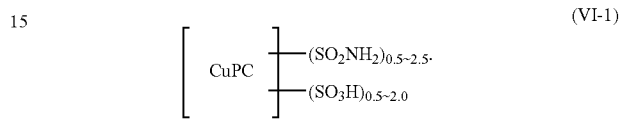
(VI-1)

10. The black dye composition as claimed in claim 2, wherein the compound of the formula (I) is that of the following formula (I-1),

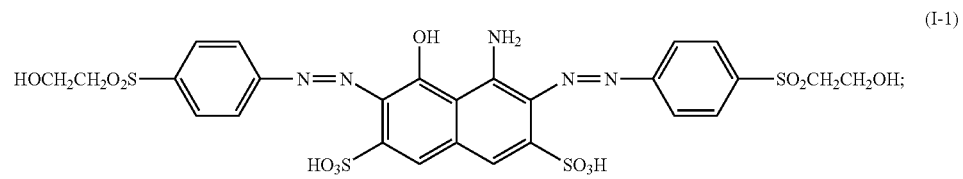
(I-1)

the compound of the formula (II) is that of the following formula (II-1),

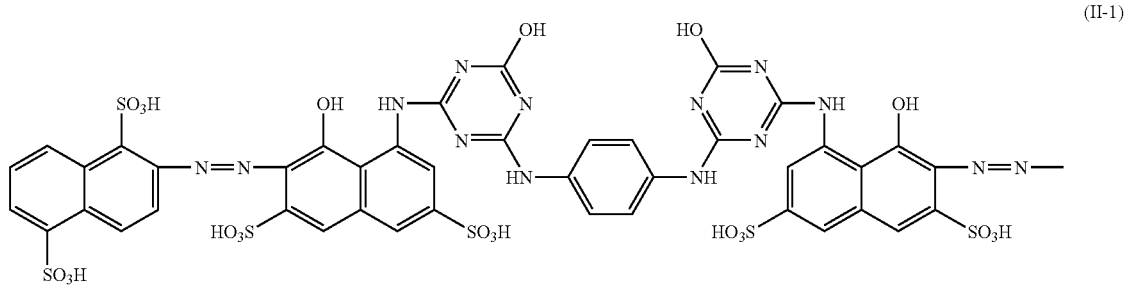
(II-1)

the compound of the formula (III) is that of the following formula (III-1),

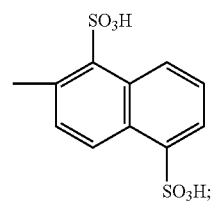

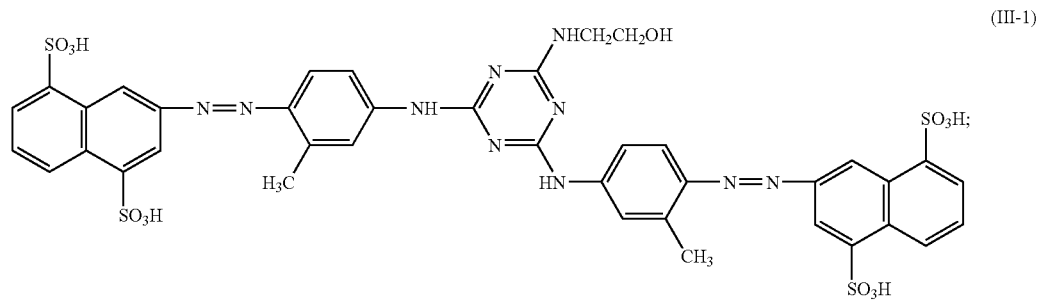

the compound of the formula (IV) is that of the following formula (IV-1),

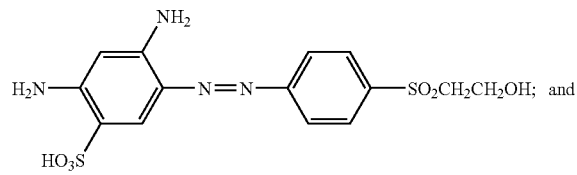

the compound of the formula (V) is that of the following formula (V-1),

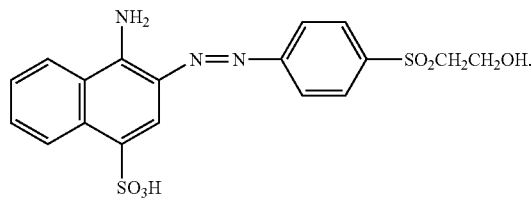

11. The black dye composition as claimed in claim 10, wherein the compound of the formula (VI) is that of the following formula (VI-1),

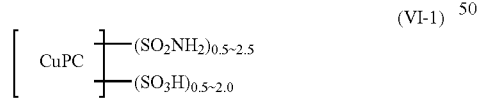

12. A black ink composition, comprising:
(A) 0.1%~35% by weight of a black dye composition as claimed in claim 1;
(B) 5%~35% by weight of an organic solvent selected from the group consisting of ethylene glycol, diethylene glycol, triethylene glycol, propylene glycol, butylene glycol, ethylene glycol monoethyl ether, ethylene glycol monobutyl ether, diethylene glycol monobutyl ether, diethylene glycol monomethyl ether, glycerin, 2-pyrrolidone, N-methyl-2-pyrrolidone, 1,3-dimethyl-2-imidazolidinone, and triethanolamine; and
(C) 25%~94.9% by weight of water.

13. The black ink composition as claimed in claim 12, further comprising:
(D) 0.1%~5% by weight of a surfactant of the following formula (IX),

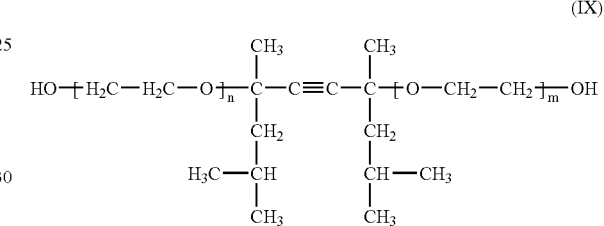

wherein the sum of n and m is integer between 0 and 50.

14. A black ink composition, comprising:
(A) 0.1%~35% by weight of a black dye composition as claimed in claim 2;
(B) 5%~35% by weight of an organic solvent selected from the group consisting of ethylene glycol, diethylene glycol, triethylene glycol, propylene glycol, butylene glycol, ethylene glycol monoethyl ether, ethylene glycol monobutyl ether, diethylene glycol monobutyl ether, diethylene glycol monomethyl ether, glycerin, 2-pyrrolidone, N-methyl-2-pyrrolidone, 1,3-dimethyl-2-imidazolidinone, and triethanolamine; and
(C) 25%~94.9% by weight of water.

15. The black ink composition as claimed in claim 14, further comprising:
(D) 0.1%~5% by weight of a surfactant of the following formula (IX),

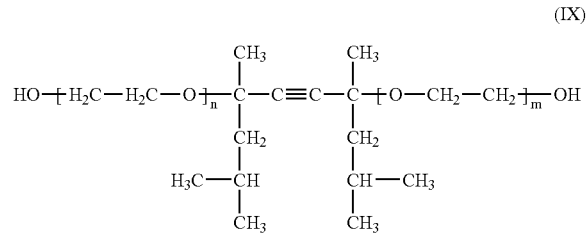

wherein the sum of n and m is integer between 0 and 50.

16. The black ink composition as claimed in claim 14, wherein the compound of the formula (I) is that of the following formula (I-1),

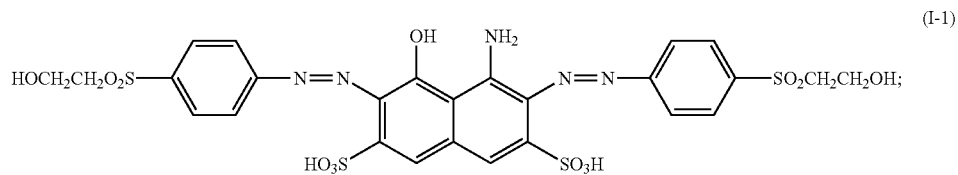
the compound of the formula (II) is that of the following formula (II-1),
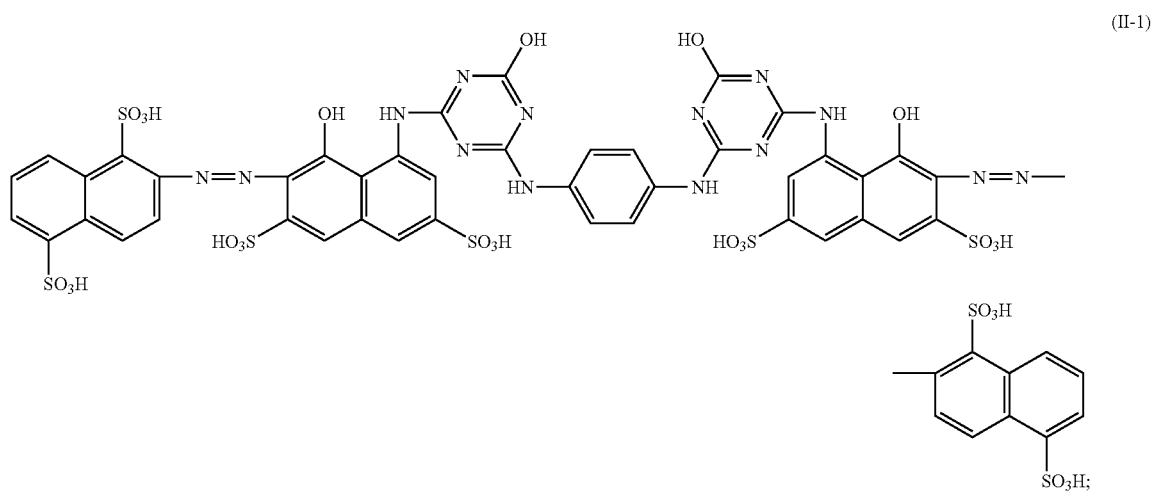
the compound of the formula (III) is that of the following formula (III-1),
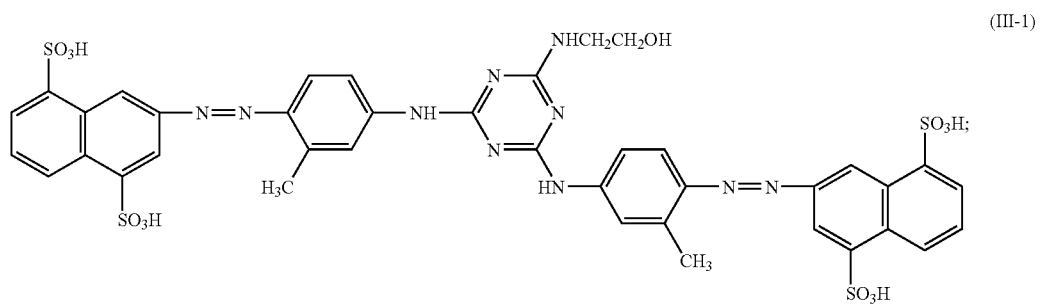
the compound of the formula (IV) is that of the following formula (IV-1),
the compound of the formula (V) is that of the following formula (V-1),
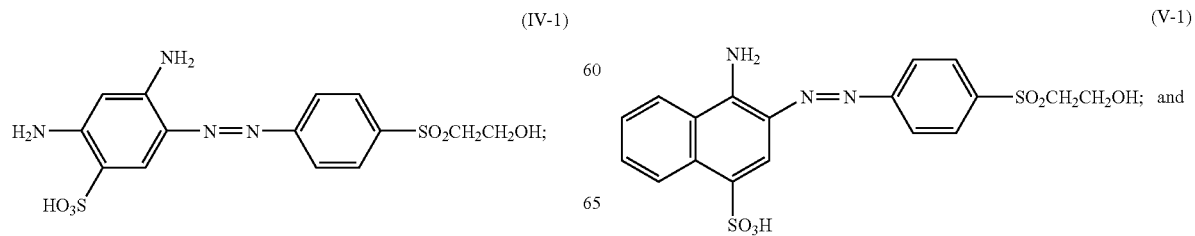

the compound of the formula (VI) is that of the following formula (VI-1),
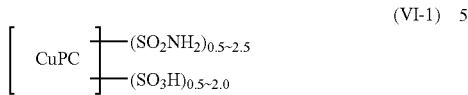
(VI-1)
17. The black ink composition as claimed in claim 15, wherein the compound of the formula (I) is that of the following formula (I-1),
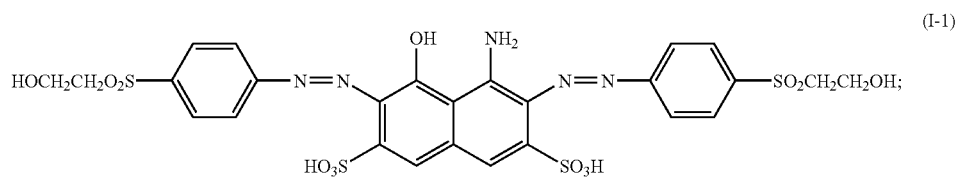
(I-1)
the compound of the formula (II) is that of the following formula (II-1),
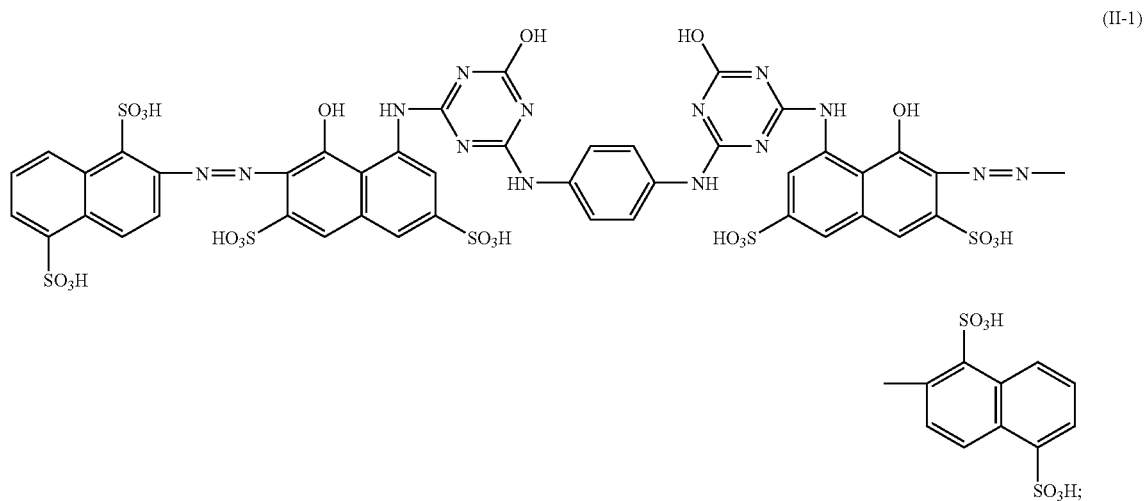
(II-1)
the compound of the formula (III) is that of the following formula (III-1),
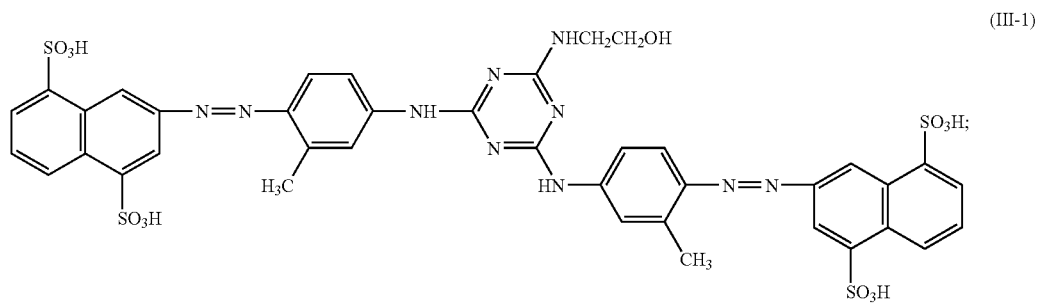
(III-1)

the compound of the formula (IV) is that of the following formula (IV-1),
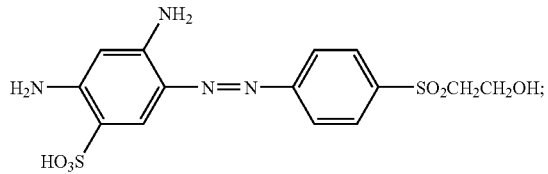
the compound of the formula (V) is that of the following formula (V-1),
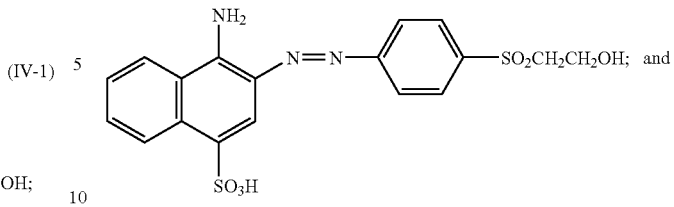
the compound of the formula (VI) is that of the following formula (VI-1),
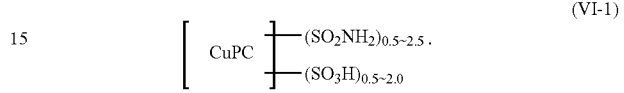
* * * * *